(12) United States Patent
Muenkel et al.

(10) Patent No.: US 8,790,431 B2
(45) Date of Patent: Jul. 29, 2014

(54) AIR FILTER WITH PRESEPARATOR

(75) Inventors: Karlheinz Muenkel, Oberderdingen-Flehingen (DE); Markus Kolczyk, Mundelsheim (DE); Stefan Becker, Mannheim (DE); Michael Heim, Freiberg a.N. (DE)

(73) Assignee: Mann & Hummel GmbH, Ludwigsburg (DE)

( * ) Notice: Subject to any disclaimer, the term of this patent is extended or adjusted under 35 U.S.C. 154(b) by 210 days.

(21) Appl. No.: 12/228,095

(22) Filed: Feb. 26, 2009

(65) Prior Publication Data

US 2013/0255203 A1 Oct. 3, 2013

Related U.S. Application Data

(63) Continuation of application No. PCT/EP2009/052319, filed on Feb. 26, 2009.

(30) Foreign Application Priority Data

Feb. 26, 2008 (DE) .......................... 10 2008 011 186
Dec. 23, 2008 (DE) .......................... 10 2008 062 955

(51) Int. Cl.
 *B01D 50/00* (2006.01)

(52) U.S. Cl.
USPC ............... 55/337; 55/385.3; 55/498; 55/482; 55/443; 55/484; 55/502; 55/462; 55/463; 55/464; 55/465

(58) Field of Classification Search
CPC ............. B01D 46/0005; B01D 46/521; B01D 46/2411; B01D 45/08
USPC ........ 55/337, 385.3, 498, 482, 443, 484, 502, 55/462–465; 123/198 E
See application file for complete search history.

(56) References Cited

U.S. PATENT DOCUMENTS

| 4,537,608 A * | 8/1985 | Koslow ........................... 55/337 |
| 5,152,890 A | 10/1992 | Linnersten |
| 7,004,986 B2 * | 2/2006 | Kopec et al. .................... 55/337 |
| 2009/0038276 A1 * | 2/2009 | Gunderson et al. ............. 55/343 |

FOREIGN PATENT DOCUMENTS

| JP | 61-11397 U | 7/1986 |
| JP | 64-022863 U | 2/1989 |
| JP | 8-309137 A | 11/1996 |

* cited by examiner

*Primary Examiner* — In Suk Bullock
*Assistant Examiner* — Dung H Bui
(74) *Attorney, Agent, or Firm* — James Hasselbeck

(57) ABSTRACT

Air filter having a preseparator with an optimized intake geometry, wherein an outflow geometry of a preseparator is matched to an intake geometry of a filter element.

9 Claims, 13 Drawing Sheets

AIR FILTER WITH PRESEPARATOR

CROSS REFERENCE TO RELATED APPLICATIONS

Priority is claimed based on Federal Republic of Germany patent application no. 102008011186.4 filed Feb. 26, 2008; and Federal Republic of Germany patent application no. DE102008062955.3 filed Dec. 23, 2008. Priority is further claimed based on international patent application number PCT/EP2009/052319, filed Feb. 26, 2009 designating the United States of America, The entire disclosure of these three applications is incorporated herein by reference.

TECHNICAL FIELD

The present invention concerns an air filter with preseparator, and in particular an air filter with preseparator with a mutually matched flow geometry between the outflow geometry of the preseparator and an intake surface of a filter element of the main filter.

In particular in the field of internal combustion engines that are used in or on vehicles, the embodiment of an efficiency-optimized and space-optimized air filter system is mandatory in order to keep the dimensions small and, on the other hand, to still enable a high efficiency of the air filter arrangement.

For example, EP 1 364 695 A1 discloses an air filter that is integrated into the intake manifold of an internal combustion engine in order to subject the combustion air to be supplied to the cylinders of the internal combustion engine to a filtration action. The air filter is substantially of a three-part configuration and comprises in a filter housing a filter element that is embodied as an exchangeable filter cartridge that is flown through axially by the combustion air and is insertable radially via a closable lid into the filter housing. A cyclone preseparator is arranged upstream of the filter cartridge and serves for separating coarse dirt particles. Downstream of the filter cartridge there is a secondary or fine filter element that is also insertable radially when the lid of the filter housing is open. The cyclone preseparator, the filter cartridge, and the fine filter element are positioned axially sequentially behind another and are flown through by the combustion air to be filtered in the axial direction without deflection.

SUMMARY OF THE INVENTION

The present invention has the object to provide an air filter with a preseparator that provides an optimized intake geometry in order to optimize in this way the efficiency of the air filter system.

The object of the present invention is solved by the subject matter of the independent claims wherein further embodiments are disclosed in the dependent claims.

According to an exemplary embodiment of the invention, an air filter for an internal combustion engine is provided with an air filter housing, a preseparator, wherein the air filter housing has a receptacle for a filter element and an unfiltered gas chamber area, wherein the unfiltered gas chamber area is delimited relative to the air filter by the air filter housing and is delimited relative to the filter element to be inserted by an outer wall surface or outer intake surface at the unfiltered gas side, wherein the preseparator has an air outflow configuration, wherein the air outflow configuration corresponds with an intake surface of a filter element be inserted, wherein the preseparator comprises a cyclone arrangement with a plurality of individual cyclones each having an outflow path, wherein the outflow paths are distributed relative to and oriented toward an intake surface of a filter element to be inserted, wherein the receptacle of the air filter housing is designed to receive a filter element in the form of a multiple bellows filter with an outwardly positioned filter bellows and a filter bellows that relative thereto is radially inwardly positioned, wherein at least some of the individual cyclones with their outflow paths are aligned on a line in correspondence with an intake passage of the filter element to be inserted.

By means of the different modes of operation of a cyclone separator and a filter element as a main filter, in an air filter housing different modes of operation and modes of action of the different filter stages in an air filter housing result. They can be optimized by the disclosed air filter in that the outflow paths that in general correspond with an outlet opening of an individual cyclone can be oriented toward the corresponding intake surfaces that are formed in case of a multiple bellows filter in general by the intake passage that is formed, for example, by two adjacently arranged filter bellows. In this connection, the individual cyclones of the cyclone arrangement are oriented such that their outflow paths or their mouths are oriented toward corresponding intake passages of the filter element so that the air that is flowing out of the individual cyclones is flowing less against, or is not flowing against, an end face that would cause an increase of the air resistance. In this way, the entire flow resistance of the air filter arrangement can be optimized in that the outflow paths of a preseparator can be arranged so as to correspond with the intake paths of a multiple bellows filter. Since a multiple bellows filter because of its construction generally has an annular intake passage, it is important for the optimization of the flow resistance within the air filter arrangement to orient the outflow paths of the individual cyclones such that they correspond with the annular intake passage geometry. In this connection, the individual cyclones can be oriented toward several intake passages that are, for example, concentric to one another. The intake passages are not mandatorily of an annular shape but can also be linear or areal in cross-section. In this connection, it can be important that no or only a limited flow reversal or flow deflection must occur for the air or fluid exiting from the individual cyclones of the preseparator.

According to an exemplary embodiment of the invention, at least one part of the individual cyclones is oriented with their outflow paths tangentially along an outer circumference of a filter element to be inserted.

Such an arrangement enables a flow-optimized intake at the filter element inserted into the air filter housing when it has an intake surface that is defined at least partially by the outer wall surface of the filter element. This is, for example, the case for folded bellows filters that have a sealing configuration that provides separation of filtered gas side and unfiltered gas side relative to the air filter housing at the outflow side. In this connection, it is not excluded that additionally an arrangement of individual cyclones or even another preseparator is provided that causes flow toward the filter element through an end face of the filter element.

According to an exemplary embodiment of the invention, an air filter for an internal combustion engine is provided that comprises an air filter housing and a preseparator, wherein the air filter housing has a receptacle for a filter element and an unfiltered gas chamber area, wherein the unfiltered gas chamber area is delimited relative to the air filter by the air filter housing and relative to the filter element to be inserted is delimited by an outer wall surface or intake surface at the unfiltered gas side, wherein the preseparator has an air outflow configuration, wherein the air outflow configuration corresponds to an intake surface of the filter element to be inserted, wherein the preseparator comprises a cyclone arrangement with a plurality of individual cyclones each having an outflow path, wherein the outflow paths are distributed relative to and oriented toward in intake surface of a filter element to be inserted, wherein at least some of the individual cyclones are oriented with their outflow paths tangentially along a circumference of a filter element to be inserted.

In this way, regardless of whether a further preseparator or further individual cyclones are provided that cause flow in the axial direction toward a filter element, an optimized intake geometry for intake via a wall surface is provided. In particular when a filter element is provided that exclusively enables intake through an outer wall surface, a preseparator or individual cyclone that causes flow to an end face of the filter element can be obsolete. Instead, the flow resistance of the entire air filter arrangement can be optimized for such filter elements in that the individual cyclones are oriented with their outflow paths tangentially along an outer circumference of the filter element to be inserted. A tangential orientation enables that the incoming air or the incoming fluid is distributed across a larger circumferential surface area or a greater circumferential path across which also the intake surface or the wall surface of the filter element extends.

According to an exemplary embodiment of the invention, the individual cyclones are arranged in a row in the direction of an axial expansion direction of a filter element to be inserted.

In an arrangement of the individual cyclones along a line the intake paths can be designed in an optimized way so that a complex guiding of incoming air to be filtered or incoming fluid to be filtered is obsolete. The individual cyclones not only can be aligned on a line in order to configure the width of an air filter housing or an air filter arrangement to be narrow but also along a circumference of the filter element to be inserted, should this be advantageous with regard to function.

According to an exemplary embodiment of the invention the air filter housing has a spacing that decreases in the circumferential direction relative to a radial wall surface of a filter element to be inserted.

In this way, it can be taken into account that tangentially guided incoming air to be filtered or a fluid moves circularly about the outer circumference of a filter element and, along the circumference, portions of the fluid to be filtered pass through the filter surface of the air filter so that the entire quantity of the fluid still to be filtered decreases along the circumference. In this way, as a fluid quantity decreases along the circumference and as a spacing is correspondingly reduced, the pressure of the fluid at the intake side of the filter element moreover can be kept substantially more constant so that the filtering efficiency of the filter element across the circumference can be designed to be more uniform or, in the optimal situation, is kept constant.

According to an exemplary embodiment of the invention, the air filter housing has a step that connects an area of a minimal spacing in a radial outward direction relative to a filter element to be inserted with an area of a large spacing in a radial outward direction relative to filter element to be inserted.

In this way, the air outflow configuration can be provided in the step. In particular, with such an arrangement the entire configuration and thus the size of the air filter housing can be designed to be more compact. The step, with respect to the circumferential surface, can be designed to be at a right angle but also, depending on the situation, can be inclined. In this connection, the surface of the step extends, for example, radially away from the filter element to be inserted. In this connection, in particular in the case of oval filter elements to be inserted and air filter housings that are provided for receiving an oval filter element, the step can be provided in the area of the less curved areas of the oval.

According to an exemplary embodiment of the invention, the step is provided with a mouth or mouths of an air outflow configuration wherein the outflow paths of the individual cyclones are oriented substantially in a tangential direction.

In this way, the step can be used as a receptacle in order to arrange the mouths of the individual cyclones so as to guide a fluid flow that exits from the individual cyclones across long distances about almost the entire circumference of a filter element to be inserted without the air flow being slowed down excessively in the circumferential direction, for example, by the folds of a folded filter.

According to an exemplary embodiment of the invention in the step a mouth of at least one individual cyclone is provided having an outflow path in a substantially tangential direction.

In this way, in particular when using several individual cyclones, a relatively compact flow geometry into an air filter housing can be provided that, as a result of several individual cyclones, that provide an annular flow across a relatively great width, for example, along a line that is parallel to an axial expansion direction of a filter element to be inserted.

According to an exemplary embodiment of the invention, the plurality of individual cyclones are distributed relative to and oriented with their outflow paths toward an annular gap between at least two filter bellows of a multiple bellows filter to be inserted.

In this way, the entire flow resistance of the air filter arrangement can be further optimized in that the outflow paths of a preseparator are arranged so as to corresponding with the intake paths of a multiple bellows filter. Since a multiple bellows filter as a result of its construction generally has an annular intake passage, it is important for the optimization of the flow resistance within the air filter arrangement to orient the outflow paths of the individual cyclones such that they correspond with an annular intake passage geometry. The individual cyclones can be distributed uniformly about the line of extension of an annular gap. In this connection, the individual cyclones can be oriented also toward several intake passages that are, for example, concentrically positioned relative to one another.

According to an exemplary embodiment of the invention, the air filter has a filter element in the form of a multiple bellows filter with an outwardly positioned filter bellows and a radially inwardly positioned filter bellows wherein the fold depth of the outwardly positioned filter bellows is smaller than the fold depth of an inwardly positioned filter bellows neighboring it.

In this way, the intake passage, in particular in case of an intake through an annular gap between two filter bellows, can be arranged relatively far radially outwardly so that the intake passage in this way has a greater effective cross-sectional surface area in comparison to an intake passage that is positioned radially farther inwardly. This is caused by the greater circumference of the annular gap when it can be positioned radially farther outwardly. Moreover, by providing a greater fold depth on a radially inwardly positioned folded bellows, the surface loading of the inner folded bellows and of the outer folded bellows are approximated to one another so that a more uniform filter surface loading occurs.

According to an exemplary embodiment of the invention, on the outwardly positioned filter bellows, on the side that is facing the intake side, a shape-preserving shell is provided wherein the shell extends only partially in a radial direction across the fold depth of the outwardly positioned filter bellows.

In this way, the shape-preserving shell provides shape stability to the filter element, which is important in particular in connection with folded bellows filters, without an end face of the folded bellows being closed off unnecessarily. Instead, the open surfaces between the filter folds can be used as additional intake surfaces in axial direction so that a greater effective cross-sectional surface area of an intake passage between an outer folded bellows and an inner folded bellows results. The unfiltered gas side and the filtered gas side of the corresponding folded bellows can be closed off by an adhesive connection that must be provided only on one side of the folded bellows for providing a reliable separation. Moreover, on the shape-preserving shell air-guiding or fluid-guiding arrangements can be provided, for example, air baffles, in order to provide an optimized and aerodynamically beneficial intake flow to the intake passage. It can be, for example, a funnel-shaped configuration of the intake surface at the end face of the shape-preserving shell that prevents fluidic stagnation points.

According to an exemplary embodiment of the invention, an individual cyclone has a cyclone passage having at its intake end a baffle arrangement that is designed so as to cause incoming air or fluid to carry out a rotational movement about an axis of extension of the cyclone passage and wherein at the outlet end a concentric outlet arrangement is provided with an inwardly positioned filtered air outlet and an outwardly positioned filtered particle outlet.

In this way it is possible to provide with relatively compact configuration an individual cyclone in which the air to be filtered or the fluid to be filtered are caused to carry out a rotational movement within the cyclone passage so that particles to be filtered out move against the outer wall of the cyclone passage as a result of centrifugal force and with advancing flow along the axial expansion direction of the cyclone passage are forced into an annular slot that is positioned outside of the inwardly positioned filtered air outlet and that represents an outwardly positioned filtered particle outlet. The air or fluid from which the heavy filtered particles have been separated reaches then the outflow area of the individual cyclone by passing through the inwardly positioned filtered air outlet, which outflow area is oriented toward the intake surface of a filter element.

According to an exemplary embodiment of the invention, an air filter for an internal combustion engine is provided with an air filter housing and a preseparator, wherein the air filter housing has an unfiltered gas chamber area and a receptacle for a filter element, wherein the unfiltered gas chamber area is delimited relative to the air filter by the air filter housing and is delimited relative to the filter element to be inserted by an outer wall surface or intake surface at the unfiltered gas side, wherein the preseparator has an air outflow configuration, wherein the air outflow configuration corresponds with an intake surface of a filter element to be inserted, wherein the preseparator comprises a cyclone arrangement with a plurality of individual cyclones each having an outflow path, wherein the outflow paths are oriented toward the intake surface of a filter element to be inserted, wherein the receptacle of the air filter housing is designed in order to receive a compact filter element in the form of a coiled fluted filter with a substantially axial intake surface, wherein the plurality of individual cyclones with their outflow paths are distributed relative to and oriented toward an intake surface of a fluted filter to be inserted and, between the plurality of individual cyclones with their outflow paths and the intake surface of a fluted filter to be inserted, a diffusion device is arranged that is designed to generate a homogenization of the pressure distribution across an intake surface.

In this way, a homogenous intake and thus a homogenous filter element loading can be achieved, in particular also for a fluted filter that is substantially flown through from its end face. In particular, with a diffusion device it can be achieved that not just the end face areas of a compact filter element that are positioned in the direct outflow path of the individual cyclone are subjected to flow but that a homogenous filter loading is achieved. A diffusion device can be comprised, for example, of an arrangement of fluid baffles or air baffles but can also be a simple grid arrangement that homogenizes the actual flow course. In this connection, the diffusion device can have differently positioned air baffles that enable, on the one hand, a uniform distribution but also can cause a rotational movement of the air or fluid that increases the travel distance between the diffusion device or the outflow surface of the individual cyclones and an end face of a compact filter element without this requiring the increase of the length of the air filter housing. In this way, homogenization of the intake air can be achieved also.

According to an exemplary embodiment of the invention, the air filter has a compact filter element in the form of a wound fluted filter with a substantially axial intake surface.

According to an exemplary embodiment of the invention, the intake surface of the compact filter element has recesses in an area that is positioned in the direction of the outflow paths of the individual cyclones.

In this way, a more uniform flow of the different filter fluids can be achieved; in particular as a result of such a recess at the intake side of the compact filter element a certain air or fluid guiding function is provided. Such recesses can be, for example, produced already in the manufacturing process of coiling a coil filter, in particular when such a recess is formed approximately annularly along an oval compact filter element or fluted filter element having an axial intake surface. In this connection, the recess can be designed to be concentric to the outer oval circumferential contour or round circumferential contour so that a kind of intake groove is formed against which the corresponding outflow paths of the individual cyclones are oriented. This can be achieved by a manufacturing method, for example, in that across the entire length of the flute geometry to be wound the latter initially tapers away from the edge at the intake side and subsequently widens again so that in the coiled state a circumferentially extending groove-shaped configuration of a recess at one end face of a compact filter element or coil filter element is formed.

According to an exemplary embodiment of the invention, in the circumferential direction between an outer wall of the air filter housing and an intake surface of a filter element to be inserted a fluid baffle arrangement is provided. With such a baffle arrangement an optimized flow geometry within the air filter housing can be provided so that in particular finer nuances in the flow path can be adjusted without the entire geometry of an air filter housing having to be modified.

It is understood that also a combination of the afore described features is possible so that partially a synergistic interaction is produced which surpasses the sum of individual effects of the aforementioned features.

In the following exemplary embodiments of the invention will be described and explained with the aid of the attached drawings.

The embodiments explained in the following are not to be viewed as limiting in any way and show expedient but not exclusive embodiments of the invention.

DETAILED DESCRIPTION OF EXEMPLARY EMBODIMENTS OF THE INVENTION

Figure 1:
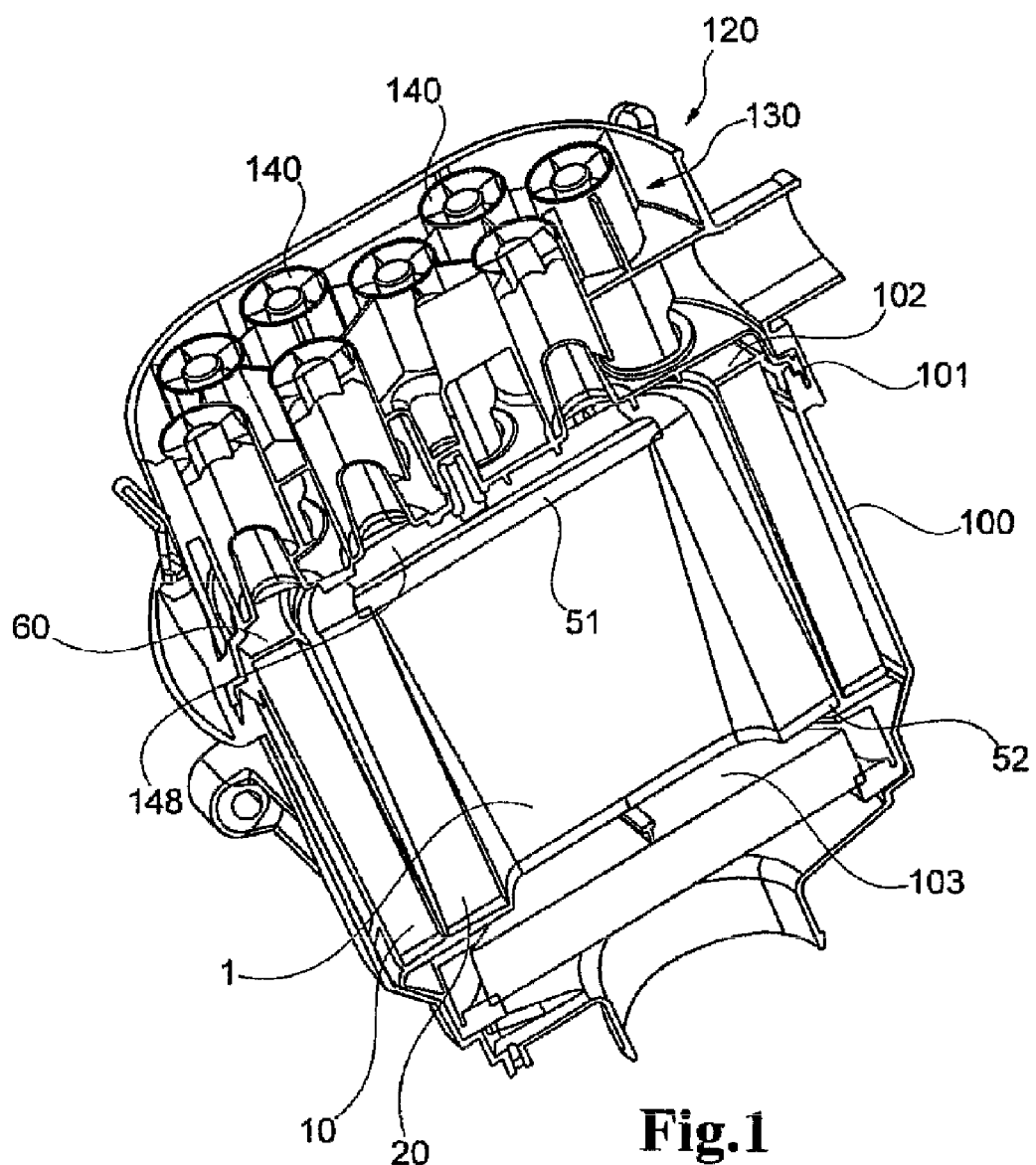
FIG. 1 shows an exemplary embodiment of an air filter with a preseparator and an inserted folded filter element.

FIG. 1 shows an exemplary embodiment of an air filter 100 as well as of a preseparator 120. The preseparator comprises a cyclone arrangement 130 that comprises in the illustrated embodiment a plurality of individual cyclones 140. The individual cyclones each have an outflow direction 148. The outflow direction of the cyclones 140 is oriented here into an unfiltered gas chamber 102 of an air filter housing. A filter element 1 is inserted into the air filter housing 100 which here is in the shape of a multiple folded bellows filter. The pre-separated particles can be removed through the dust removal socket 129 without additional suction action, for example, by self-cleaning by means of gravity, engine pulsations etc. This simple, inexpensive configuration may result in a greater cyclone cell diameter which however does not clog so easily.

The illustrated filter element has an outer folded bellows 10 as well as an inner folded bellows 20. As a result of the illustrated mounting direction of FIG. 1 with a seal arrangement in the area of the receptacle 101 of the air filter housing for a filter element 1 on a side of the air filter housing that is facing the unfiltered gas side, the embodiment of the filter element 1 with the two folded bellows 10, 20 provides an intake passage between the two folded bellows 10 and 20. The filter element 1 in the illustrated embodiment is provided with a shape-preserving shell 60 on which also the seal configuration of the filter element 1 is provided with which the filter element 1 is inserted into the receptacle 101 of the air filter housing 100. In the embodiment illustrated in FIG. 1 two opposed sides of the inner folded bellows 20 are connected by means of the sealing element 51 so that the unfiltered gas side 102 and the filtered gas side 103 relative to the filter element 1 are separated from one another in a leakage-proof way. Since the air filter illustrated in FIG. 1 has a configuration in which the receptacle 101 is arranged axially in the direction toward the preseparator, for a corresponding configuration of the illustrated twin folded bellows filter a single intake passage is provided that extends in the form of an annular gap circumferentially on the intake surface of the unfiltered gas side of the filter element. The individual cyclones 140 are oriented toward this arrangement of the annular gap of the intake passage so that the outflow paths 148 correspond with the annular gap of the intake passage. At the outflow side of the filter element the first folded bellows 10 and the second folded bellows 20 are connected seal-tightly by a second sealing element 52 so that also at this side a leakage-proof separation of filtered gas side and unfiltered gas side relative to the filter element 1 is ensured.

Figure 2:
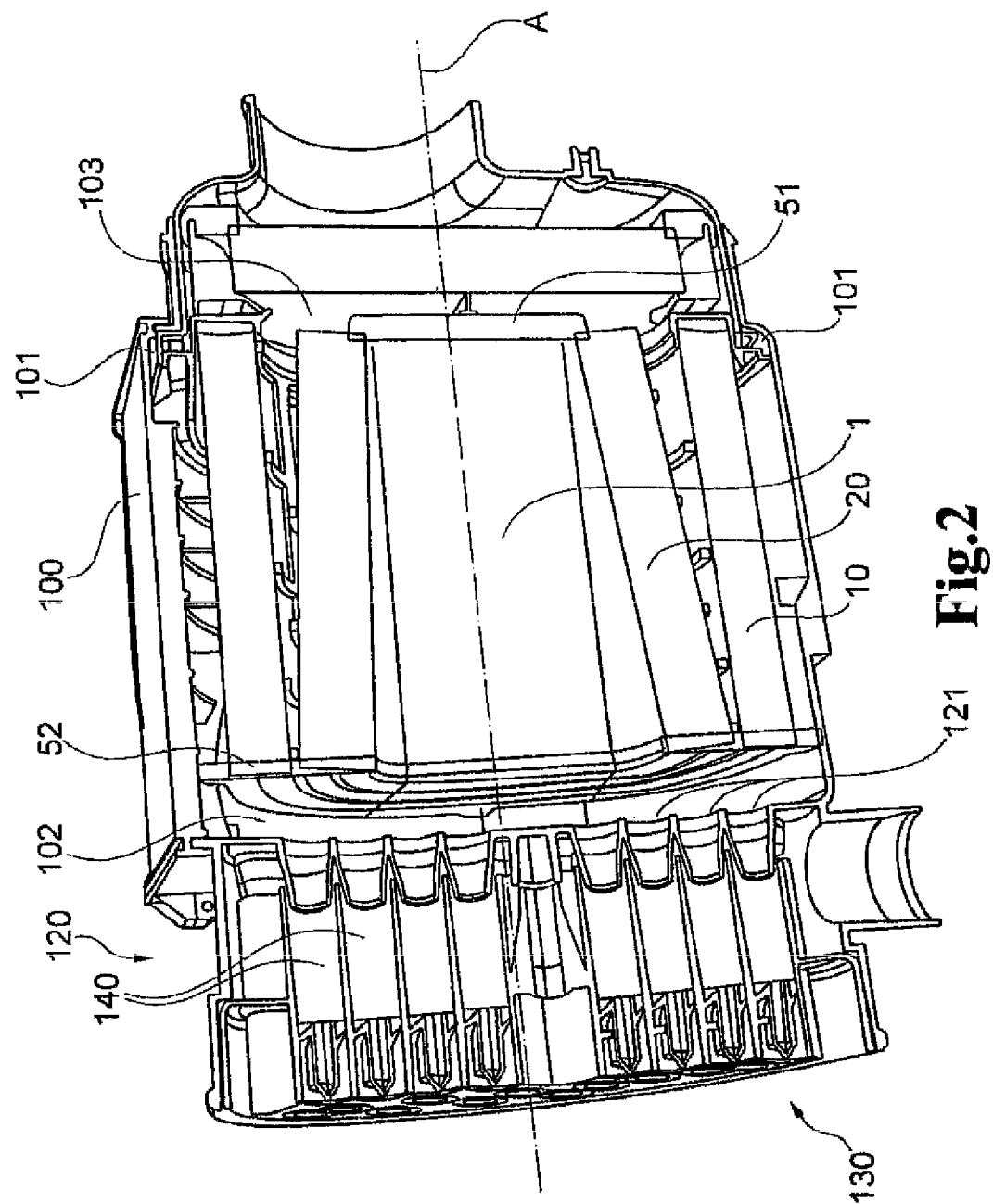
FIG. 2 shows a further exemplary embodiment of an air filter with a mounted folded filter element.

FIG. 2 shows an alternative embodiment of an air filter with a preseparator 120 that is arranged on filter housing 100. The preseparator 120 also comprises a cyclone arrangement 130 that comprises a plurality of individual cyclones 140. In comparison to the arrangement shown in FIG. 1, the preseparator 120 illustrated in FIG. 2 has a greater number of individual cyclones. The air outflow configuration 121 of the preseparator or the cyclone arrangement is also arranged so as to be optimized with regard to the intake geometry of the filter element 1. The pre-separated particles can be removed also by means of the dust removal socket 129 by means of external suction, for example, by an exhaust gas ejector or other vacuum sources such as the radiator fan. For this purpose, an additional line is needed. At the same time, the cyclone cell diameter can be reduced which causes a higher degree of separation as a function of the operating principle.

In contrast to FIG. 1, the filter element 1 is mounted in a direction in which the receptacle 101 for a filter element 140 for an air filter housing 100 is arranged on a side of the air filter housing 100 that faces away from the preseparator 120. Accordingly, the receptacle and thus also the sealing configuration for sealing the filter element relative to the air filter housing 100 is positioned on a filtered gas side of the air filter housing relative to the filter element 1. In this way, the unfiltered gas area 102 is enlarged because the air filter illustrated in FIG. 2 now comprises a filter element that has an intake with two intake passages. Intake of the filter element 1 illustrated in FIG. 2 is realized by the outer wall surface because the unfiltered gas chamber 102 also extends laterally past the filter element 1 to the sealing line that extends the area of the receptacle 101. Moreover, the filter element 1 embodied in FIG. 2 as a double-bellows filter has a further intake passage that is substantially delimited by the unfiltered gas side of the inner folded bellows 20 and extends centrally within the filter element 1. As explained already in reference to FIG. 1, the two opposed sides of the inner folded bellows 20 are connected to one another by means of the sealing element 51 at the filtered gas side while the outer folded bellows 10 and the inner folded bellows 20 are connected to one another at the unfiltered gas side by means of the sealing element 52 in a leakage-proof way.

Because of the fact that the configuration illustrated in FIG. 2 now provides two intake passages, the individual cyclones each can be oriented toward the corresponding intake passages. Since the intake passages are positioned radially outwardly and radially inwardly, respectively, on the end face of the filter element 1, the individual cyclones 140 can be made somewhat smaller than in the embodiment shown FIG. 1 but, in turn, can cover the entire annular gap length of both intake passages that in the embodiment illustrated in FIG. 2 is substantially longer than that of the individual annular gap of FIG. 1.

Figure 3:
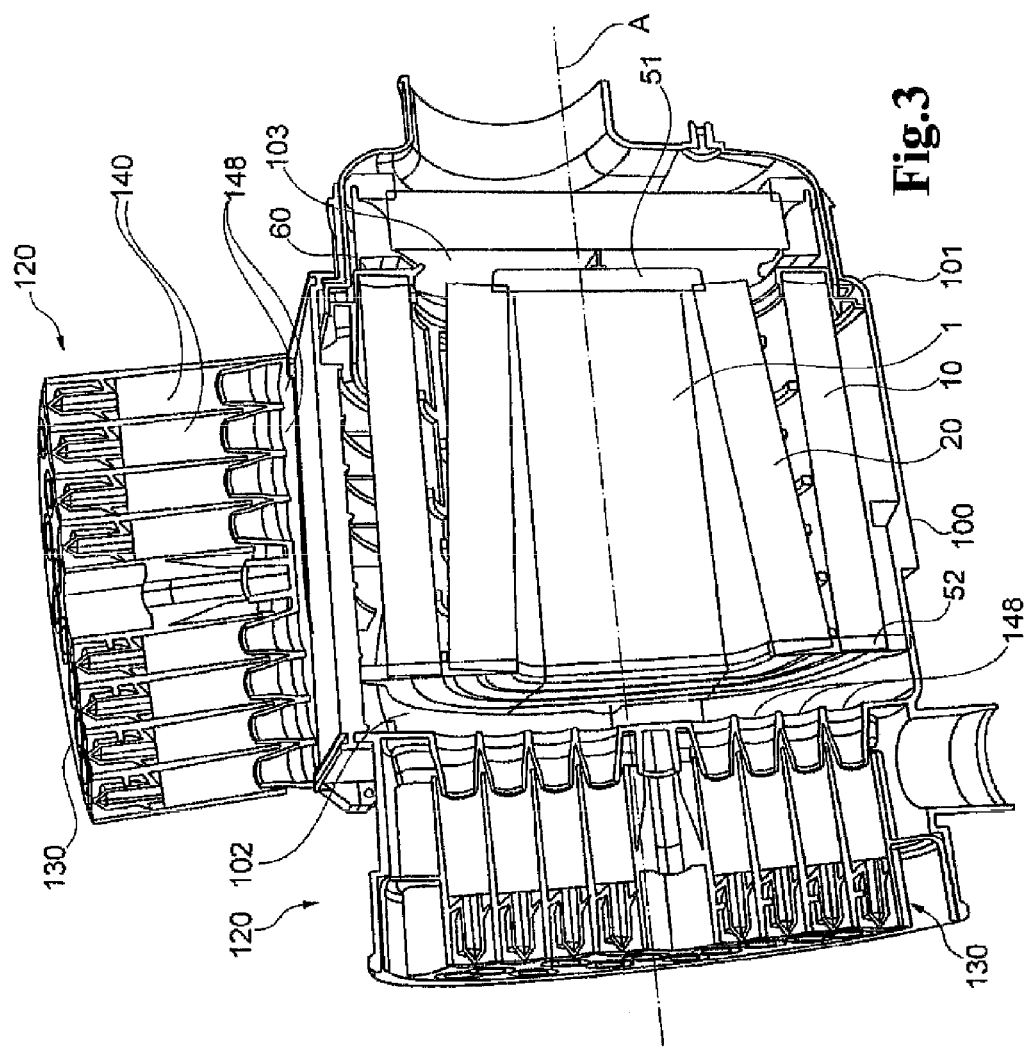
FIG. 3 shows an exemplary embodiment of an air filter with tangentially arranged cyclones.

FIG. 3 shows a further exemplary embodiment of the invention in which, in addition to the preseparator 120 that is arranged in the axial expansion direction A of the air filter, a further preseparator 120 is arranged laterally, which in principle has a similar or the same configuration as the preseparator arranged on the axial expansion direction. The second preseparator 120 that is arranged radially has also a cyclone arrangement 130 with a plurality of individual cyclones 140 each having a flow path 148. It is understood that such a radially arranged preseparator arrangement can be provided also without an axially arranged preseparator arrangement so that exclusively a radially arranged preseparator with individual cyclones 140 is provided. The embodiment illustrated in FIG. 3 shows an air filter with air filter housing 100 with a twin folded bellows filter as filter element 1 in which the sealing action of the unfiltered gas chamber 102 relative to the filtered gas chamber 103 is located on a sealing seam in the area of the receptacle 101 at the side of the filtered gas side 103. In this way, for the filter element 1 in the air filter housing 100 there is again in analogy to FIG. 2 a two-passage intake geometry in which an intake passage is arranged centrally and a further intake passage is arranged radially outwardly so that by means of the radially outwardly positioned intake passage an intake through the outer wall surface of the outer filter bellows 10 can be realized. In this way, the inner wall surface of the inner intake passage formed by the inner filter bellows 20 can be supplied by the axially arranged preseparator with individual cyclones arranged thereat while the radially outwardly positioned intake passage is supplied through the outer wall surface of the outer folded bellows 10 through the radially arranged preseparator 120 with the individual cyclones 140 arranged therein. In this way, a targeted flow of the wall surfaces can be achieved in order to provide optimal flow geometry within an air filter housing.

Figure 4:
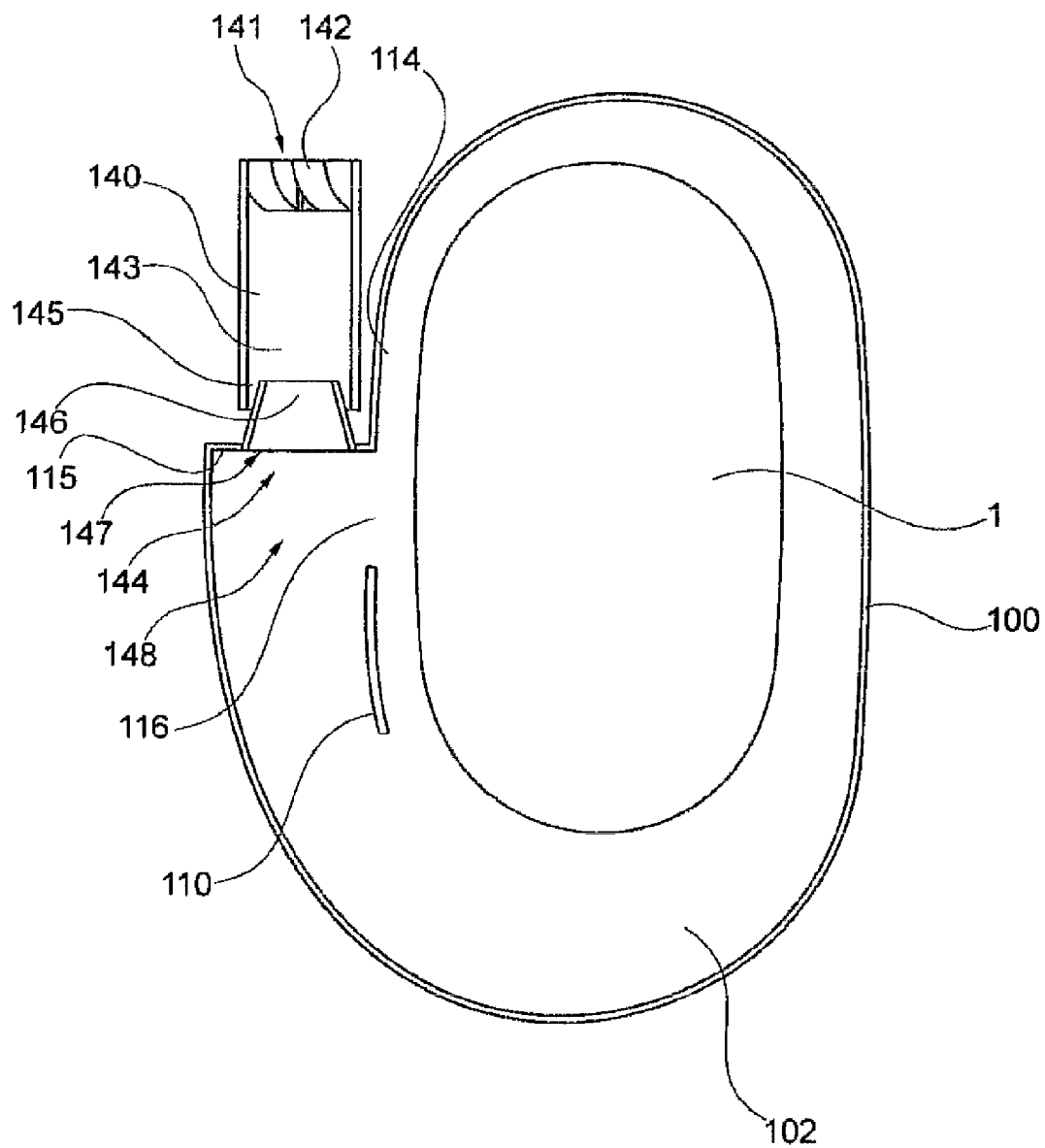
FIG. 4 shows a radial section view of an air filter with a cyclone providing tangential flow.

FIG. 4 shows a section view of a radial expansion direction of a filter element 1 or a filter housing 100. In this arrangement the radial arrangement of an individual cyclone 140 is illustrated which in the illustrated embodiment is oriented with its outflow path 148 in a tangential direction relative to the outer wall surface of the filter element 1. The individual cyclone 140 has a cyclone passage 143 with an intake side 141 and an outlet side 144. In this connection, the intake side 141 has an air baffle arrangement 142 that is arranged such that incoming air or incoming fluid is caused to rotated about a longitudinal axis of the cyclone passage 143 which causes the dust particles contained therein to be thrown by centrifugal force against the outer wall of the cyclone passage 143 and, in case of a superimposed flow from the intake side 141 in the direction of the outlet side 144, will drop or be forced into the intermediate space 145 between the cyclone passage housing and the outlet funnel. In this way, as a result of centrifugal forces, the fluid to be filtered or the air to be filtered can be separated from heavy dust particles while the air that is separated from dust particles passes from the filtered air outlet opening 146 into the unfiltered gas chamber 102 of the air filter housing 100. The air filter housing has in the embodiment illustrated in FIG. 4 an area which has only a minimal spacing to the air filter 1 to be inserted and which is identified in FIG. 4 by 114. Moreover, the air filter housing 100 has also an area 116 that has a relatively wide spacing of the air filter housing to the air filter element 1 to be inserted. These two areas 114 and 116 are separated by a step 115 from one another wherein this step in the embodiment illustrated in FIG. 4 extends in the radial direction. In this step, for example, the mouth of the individual cyclone can be provided, in particular when it blows in a tangential direction into the interior or the unfiltered gas chamber 102 of the air filter housing 100. In this way, the incoming fluid or the incoming air can be caused to rotate tangentially about the filter element 1 so that not only the wall area of the filter element 1 that is in immediate vicinity of the cyclone outlet is supplied but also in the circumferential direction areas of the filter element that are father removed. Since, caused by operation, fluid to be filtered or air to be filtered passes through the filter surface of the filter element 1, the quantity of fluid to be filtered in the circumferential direction is reduced because it passes successively through the filter surface from the unfiltered gas chamber 102 into the filtered gas chamber, not shown here. By means of a tapering configuration of the intermediate space between the air filter housing 100 and the filter element 1, the existing pressure of the fluid to be filtered or the air to be filtered can remain substantially constant across the entire circumferential length of the filter element 1. In order to avoid in particular turbulences in the area of the intake mouth at the step 115, air baffles 110, for example, or other flow-guiding and optimizing devices can be provided. Instead of the individual cyclone a simple socket can be provided also that causes an air intake with tangential flow direction. By a tangential supply flow direction and a circular guiding of the flow about the filter element 1 in the housing 100 a preseparation can be achieved. In this case, a dust removal means can be integrated into the housing in order to remove the separated particles from the housing.

Figure 5:
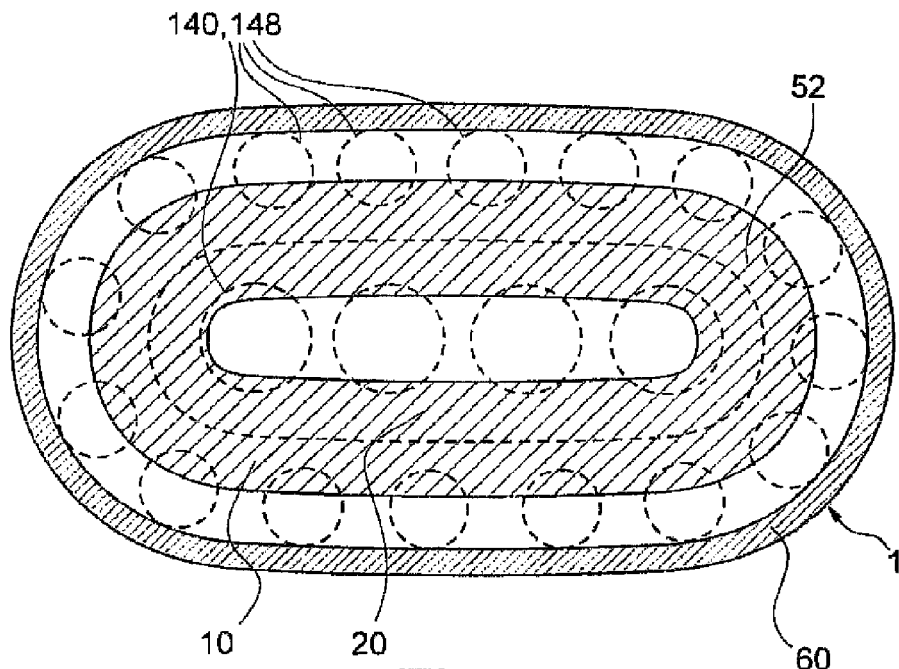
FIG. 5 shows a plan view of a filter element of a side with two intake and outflow passages.

FIG. 5 shows a schematic view of a folded filter element with a schematically shown arrangement of individual cyclone outflow paths 148. FIG. 5 shows an embodiment in which the filter element has two intake passages in analogy to the embodiments disclosed in connection with FIGS. 2 to 3. The shape-preserving shell 60 with a sealing geometry arranged thereat is located in the axial direction of the air filter housing facing away from the individual cyclones 140. In the embodiment illustrated in FIG. 5 the outer folded bellows 10 and the folded bellows 20 are connected to one another in a leakage-proof way by the second sealing element 52 so that air to be purified that is supplied by the individual cyclones flows into the outer filter passage as well as the inner filter passage. Through the outer filter passage the air to be filtered flows through the outer wall surface of the outer folded filter into a filtered gas area, not illustrated, while the incoming air passing through the inner intake passage flows through the inner wall surface of the inner folded bellows into the filtered gas area.

Figure 6:
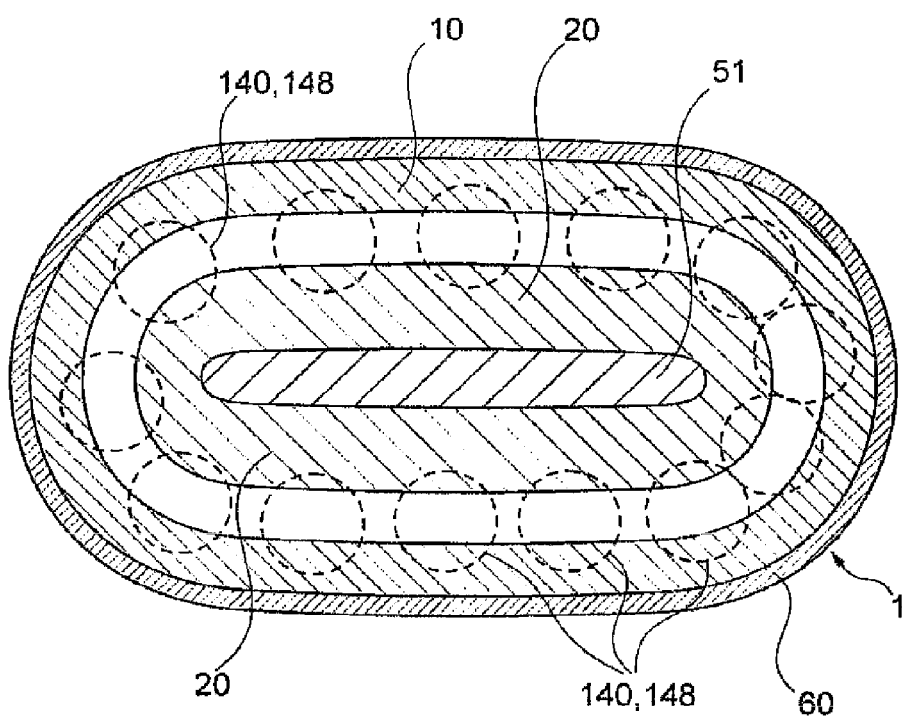
FIG. 6 shows a plan view of a filter element with an intake or outflow passage.

FIG. 6 shows an arrangement of a filter element that may coincide substantially with the filter element illustrated in FIG. 5 wherein however this filter element is then viewed from the axially opposed side. In this case, the intake passage is formed by the inner wall surface of the outer filter element 10 and the outer wall surface of the inner filter element 20. The thus resulting annular passage is supplied from the outflow paths 148 of the individual cyclones 140. In this connection, the opposed inner wall surfaces of the inner folded filter 20 are sealed in a leakage-proof way by a first sealing element 51. In the plan view shown in FIG. 6, a shape-preserving shell 60 is embodied to be relatively narrow so that also the end faces of the outer folded bellows as well as of the inner folded bellows 20 are available as an intake surface. It is understood in this connection that the fold sides at the filtered gas side, that are positioned inwardly in case of the inner folded bellows filter 20 and in case of the outer folded bellows filter 10 are positioned outwardly, each are connected in a leakage-proof way to the first sealing element 51 or the sealing shape-preserving shell 60 so that again a reliable separation between filtered gas side and unfiltered gas side is ensured.

Figure 7:
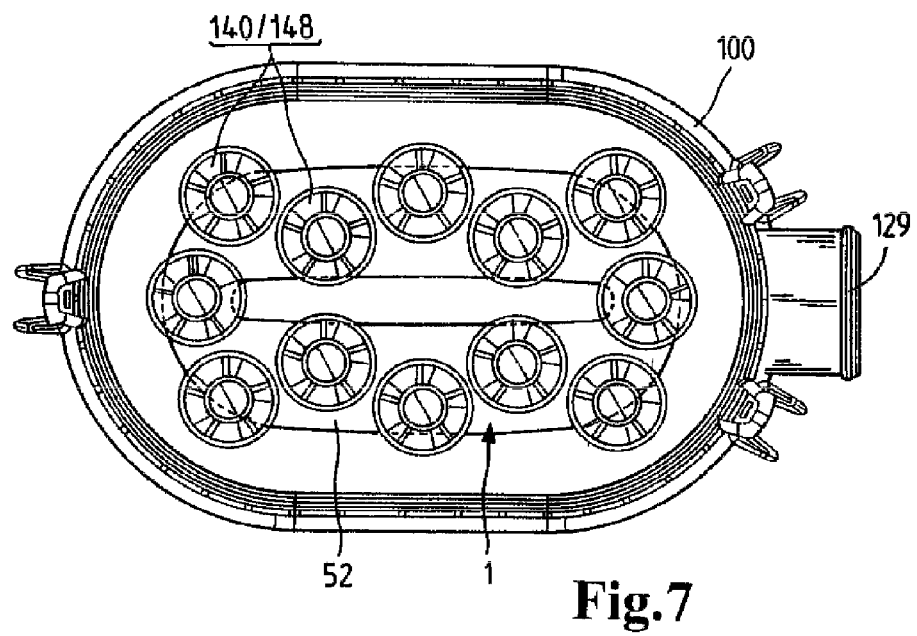
FIG. 7 shows a plan view of a side with an intake passage of a preseparator geometry with a filter element.

FIG. 7 shows a plan view of a side with an intake passage of a preseparator geometry with a filter element. The cyclones 140 are distributed along the opening of the intake passage. In this connection, the cyclones do not follow directly the circumferential contour of the filter element 1 to be inserted but in the illustrated embodiment are slightly displaced. In this way, an optimization with regard to the intake behavior as well as the geometric arrangement with regard to the space requirement for the cyclones can be achieved. Laterally a dust removal outlet 129 is provided by means of which the particles separated in the cyclones 140 may be removed either by gravity or by external suction action.

Figure 8:
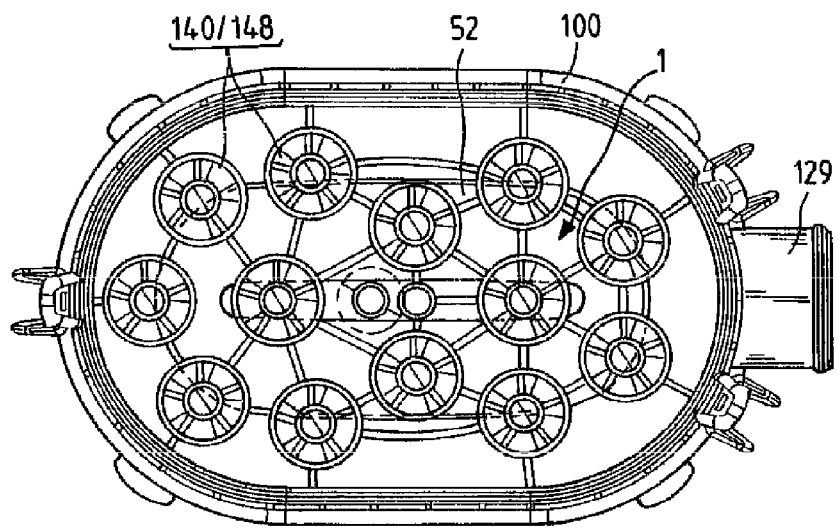
FIG. 8 shows a plan view of a side with two intake passages of a preseparator geometry with a filter element.

FIG. 8 shows a view onto a preseparator geometry with a filter element from one side with two intake passages. The illustrated cyclones 140 have a somewhat smaller diameter than the cyclones shown in FIG. 7. However, these cyclones are distributed such that they supply two intake passages, a central inner one and an outer one. Here, an optimization with regard to the incoming flow and the geometric arrangement is also dominant so that with regard two both aspects an optimal arrangement can be provided.

Figure 9:
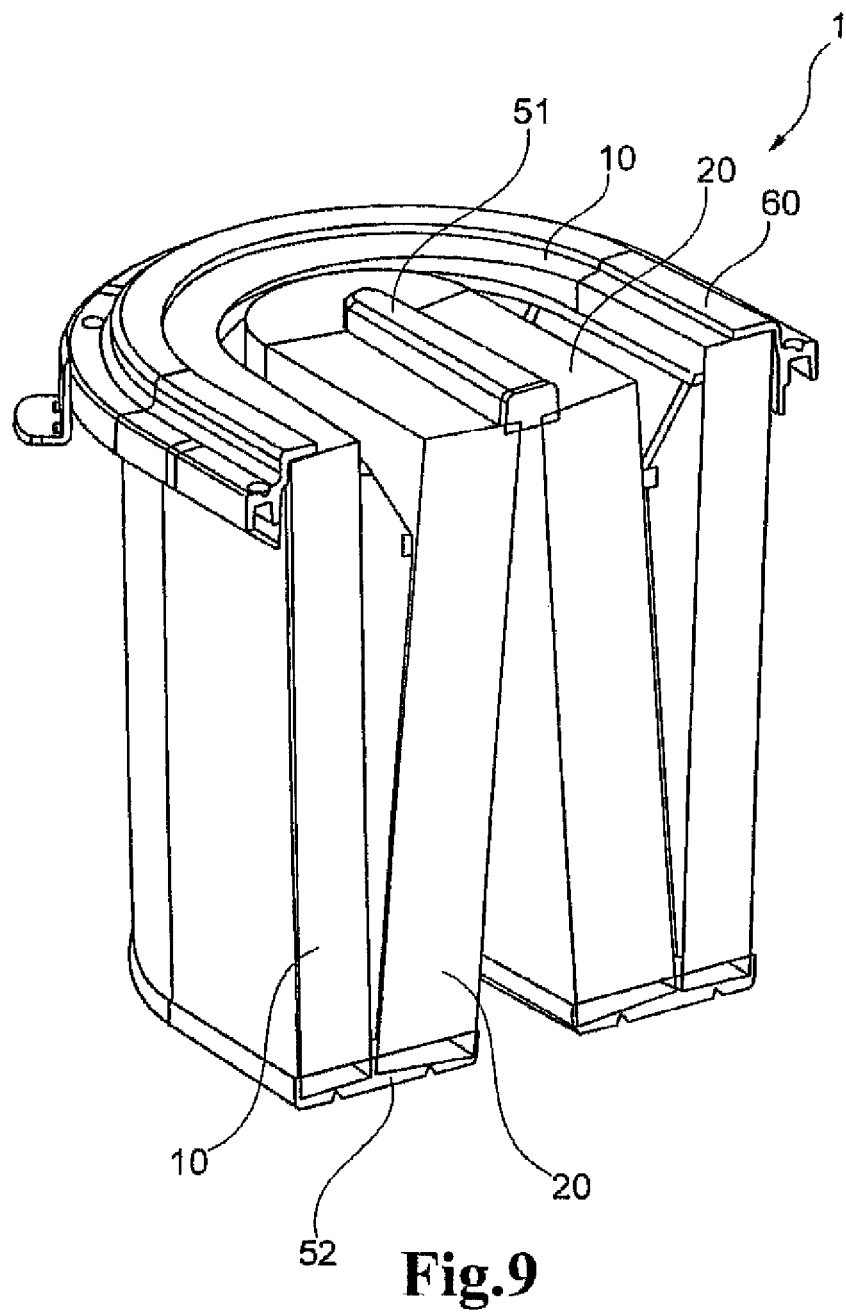
FIG. 9 shows a multiple folded filter element according to an exemplary embodiment of the invention.

FIG. 9 shows a three-dimensional schematic view of a double-bellows folded filter element wherein the side that can be seen from above at a slant matches the plan view of the folded filter illustrated in FIG. 6 while the bottom side that is hidden here corresponds to the plan view of the filter element 1 shown in FIG. 5. In FIG. 9, the schematic configuration of the folded filter element can be seen somewhat more clearly as a result of the spatial illustration of the filter element. The shape-preserving shell 60 is provided with a sealing arrangement that can engage a receptacle, not illustrated, of an air filter housing. The shape-preserving shell 60 extends in the illustrated embodiment only partially across the fold depth of the outer folded bellows 10 in order to improve in this way the intake surface of the outer folded bellows, in particular of the inner wall surface of the outer folded bellows 10, in as much as there is incoming flow from this side.

Figure 10:
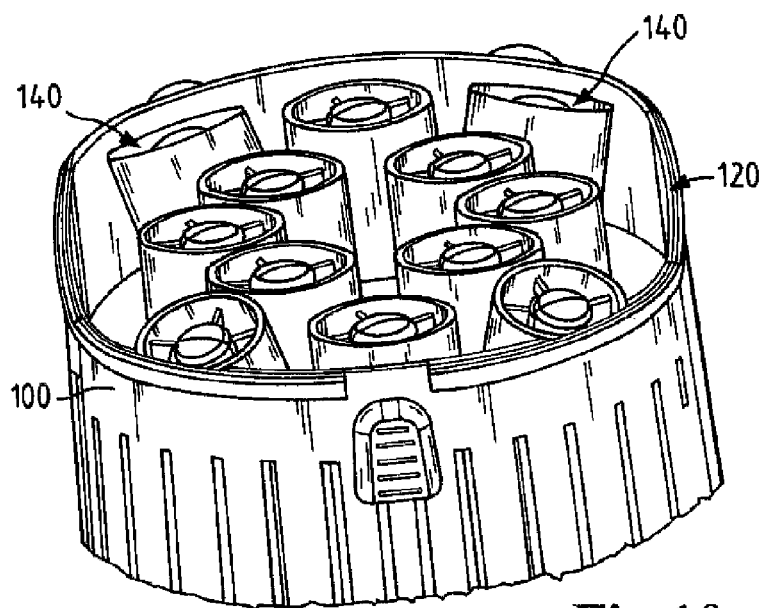
FIG. 10 shows a preseparator geometry as shown in FIG. 7 with slantedly positioned cyclones.

FIG. 10 shows the preseparator geometry shown in FIG. 7 with slantedly positioned cyclones. The cyclones are oriented with their outlets or outflow geometries toward the intake passages. This can be realized not only by means of an appropriate distribution about the circumference but also by an orientation of the cyclone outlets. For this purpose, the entire cyclones or only their outlets may be positioned at a slant.

Figure 11:
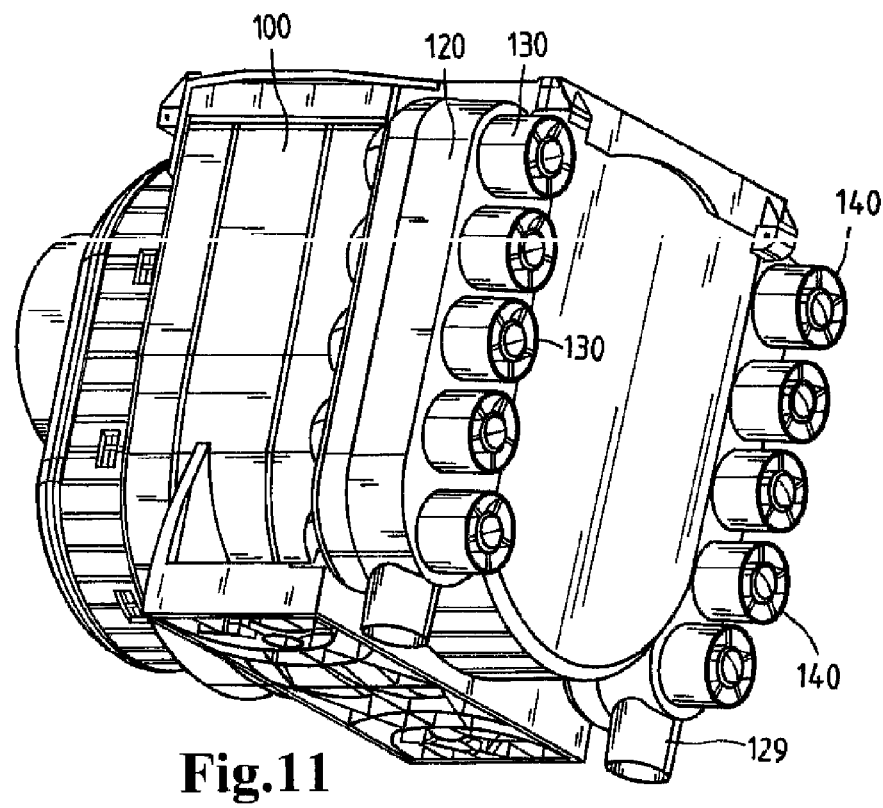
FIG. 11 shows a preseparator geometry with two laterally arranged cyclone blocks with intake in the axial direction.

FIG. 11 shows a preseparator geometry with two laterally arranged cyclone blocks with incoming flow in the axial direction. The cyclones 140 in the illustrated embodiment are arranged at the edge so that the central area remains accessible, for example, for a housing flap or a housing lid for exchanging the filter element. The cyclones can supply flow to the filter element at a slant or radially. Moreover, the cyclone outlets of the cyclone arrangement 130 can also be positioned such that a tangential flow will be created in the air filter housing 100. The cyclone units of the preseparator 120 have a dust outlet opening 129 for removal of separated particles.

Figure 12:
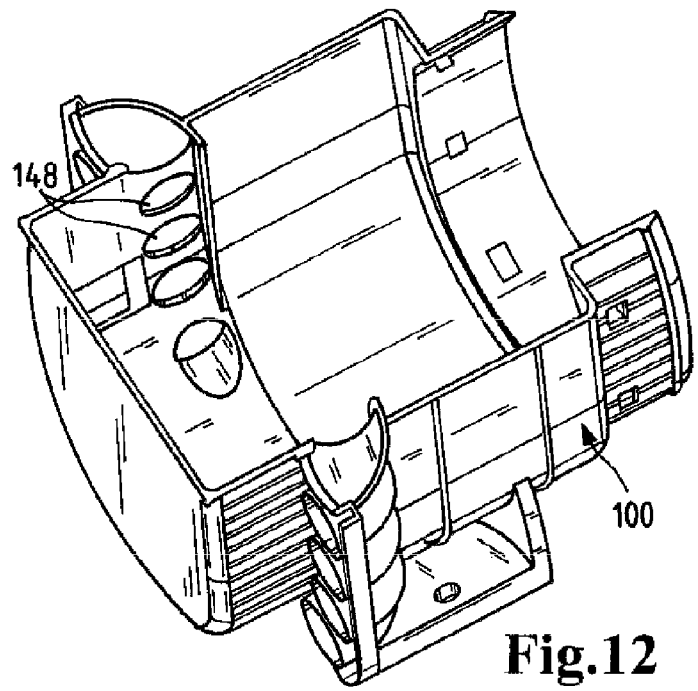
FIG. 12 shows an interior view of an air filter housing of the embodiment of FIG. 11.

FIG. 12 shows an interior view of an air filter housing of the embodiment shown in FIG. 11. Clearly shown is the outflow geometry 148 that opens into the interior of the air filter housing 100. Intake is realized in the radial direction. The outlets can have an intermediate chamber that enables a uniform pressure distribution, in particular when one of the cyclones is clogged. By a transverse flow downstream of the actual cyclone outlet a uniform flow into the air filter housing 100 is possible. The cyclones themselves are not illustrated.

Figure 13:
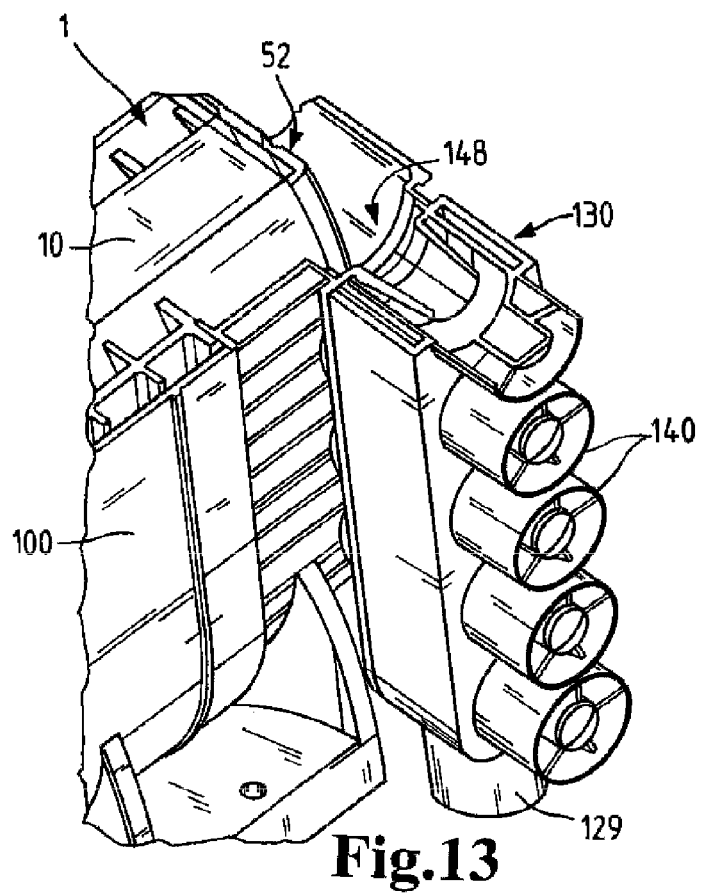
FIG. 13 shows an embodiment with cyclones with intake in the radial direction.

FIG. 13 shows an embodiment in which intake at the cyclones is radial. In the illustrated arrangement the cyclones open directly into the interior of the air filter housing 100. In particular for radially projecting cyclones, the length of the air filter housing with preseparator can be kept short.

Figure 14:
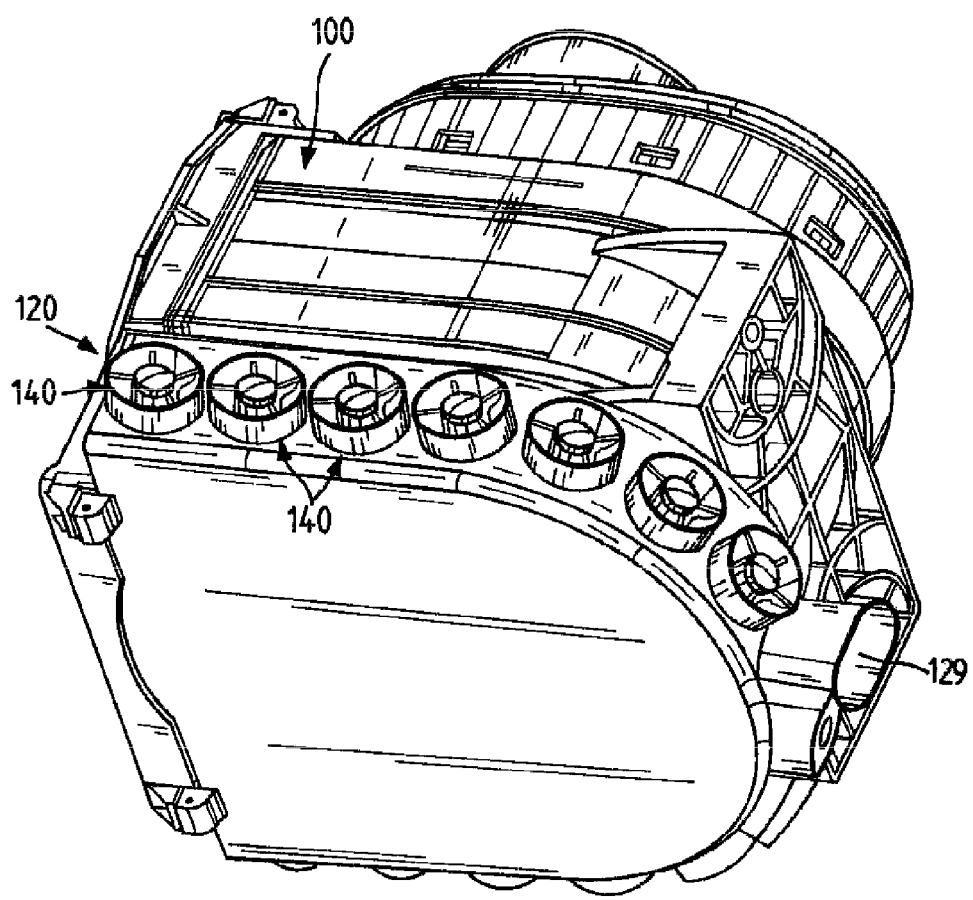
FIG. 14 shows an embodiment in which the cyclones are arranged substantially on a circumference of the air filter housing and intake is in the radial direction.

FIG. 14 shows an embodiment in which the cyclones are arranged substantially on a circumference of the air filter housing with flow coming in radially. An arrangement along almost the entire circumference enables a uniform intake flow. The dust outlet 129 can then be combined for both sides of the cyclone arrangement. The end face of the air filter housing remains free so that an opening flap may be provided in order to exchange the filter element. The cyclones may also project radially into a space that is located upstream of the filter element so that also the radial expansion of the filter housing can be kept small. It is also possible to provide cyclones on or in the lid so that they are folded out when opening the lid in order to make the interior of the housing accessible, in particular when the cyclones project radially inwardly.

Figure 15:
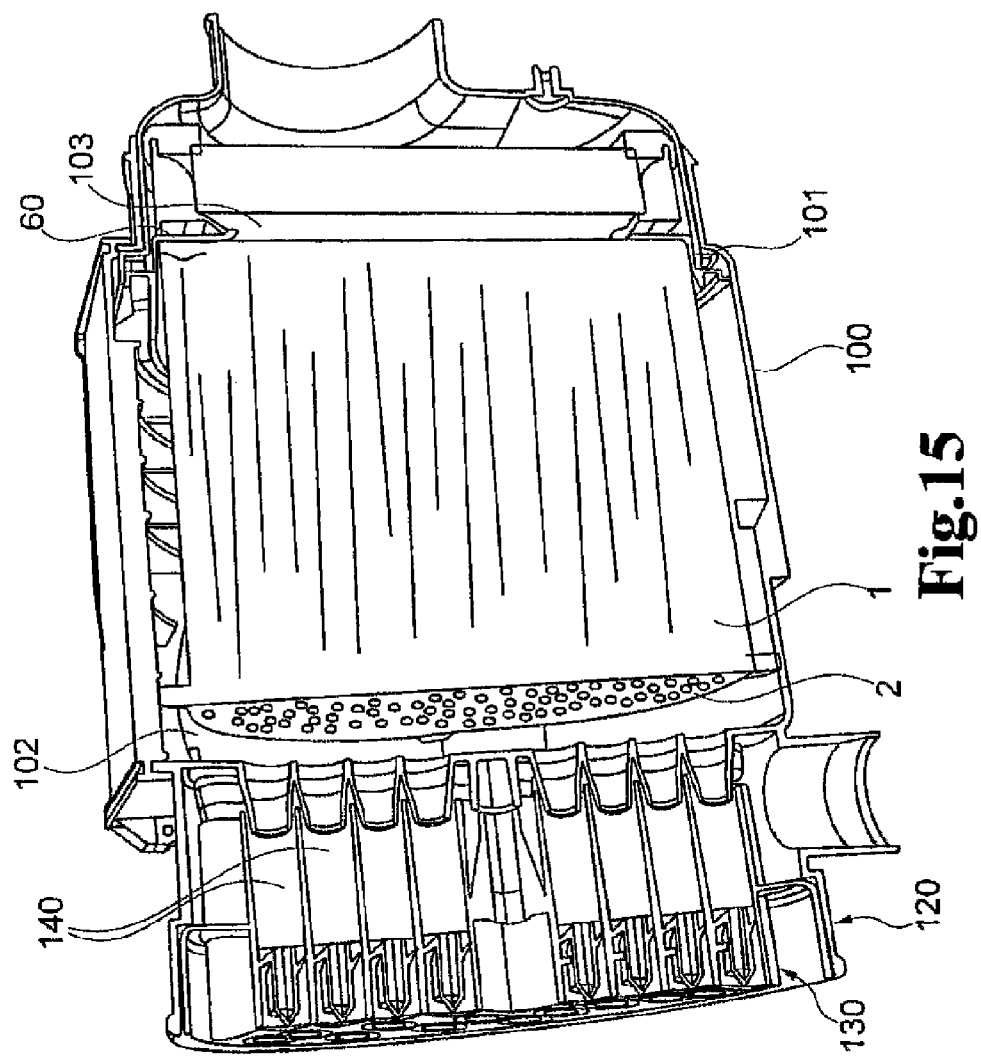
FIG. 15 shows an exemplary embodiment of an air filter with a fluted, coil or compact filter element.
Figure 16:
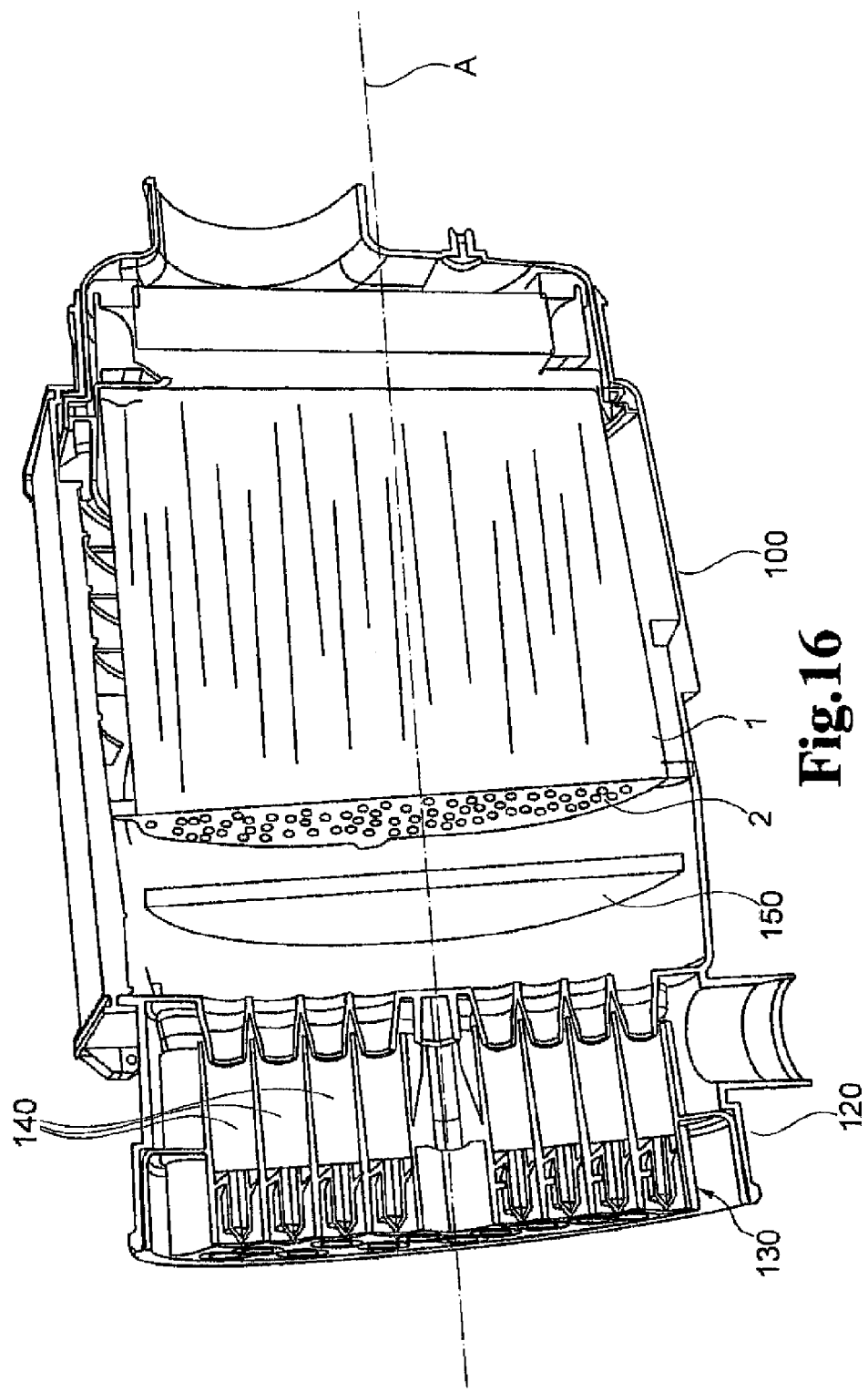
FIG. 16 shows an exemplary embodiment of an air filter with a diffusion device.

FIG. 15 shows a further exemplary embodiment of the invention with an air filter with an air filter housing 100 and a filter element receptacle 101 that is arranged in axial direction of the air filter housing at the filtered air side. Into the air filter housing illustrated in FIG. 15 a filter element 1 in the form of a compact element or fluted filter or coil filter is inserted. Such coil or fluted filters have an intake surface that in general extends orthogonally to the flow direction. In this connection, the fluted or coil filter illustrated in FIG. 15 generally has no intake surface that extends along the outer circumference. Therefore, for a fluted or coil filter as shown in FIG. 15 it is in general inconsequential at which location the receptacle 101 for a filter element 1 in the filter housing 100 and a corresponding seal are arranged. Without having any effect on the actual filtering result, it can be provided even on the unfiltered gas side 102 instead of on the filtered gas side 103. An arrangement of the seal arrangement on the receptacle 101 at the unfiltered gas side 102 would however prevent that larger dust particle quantities could collect within the air filter housing and, for example, could move between the filter element 1 and the filter housing 100 without being able to move away from there. The preseparator 120 illustrated in FIG. 15 moreover has a cyclone arrangement 130 with a plurality of individual cyclones 140 whose mouth is oriented toward the intake surface 2 of the filter element 1. In such an arrangement it is possible that, when providing a smaller number of individual cyclones, only certain areas of the intake surface 13 are supplied with the fluid to be filtered. Therefore, it can be expedient to provide between the outflow areas of the preseparator 120 and the intake surface 2 of the filter element 1 a diffusion device 150, as shown in FIG. 16. Such a diffusion device can be provided, for example, in order to homogenize the possibly inhomogeneous outflow from the preseparator 120 so that the intake flow onto the intake surface 2 of the filter element 1 is homogenous. Such a diffusion device 150 can be, for example, in the form of a nonwoven or any other suitable materials such as foam materials, but can also be comprised of an arrangement of baffles by means of which the incoming air is distributed onto the intake surface 2 of the filter element 1 in such a way that a homogenous flow results. Moreover, the baffles provided in the diffusion device 150 can be arranged such that the air behind the diffusion device is caused to rotate above axial expansion direction A so that the path that is being traveled between the diffusion device 150 and the intake surface 2 is extended without however the spacing between the diffusion device 150 and the intake surface 2 having to be changed. In this way, also a homogenous flow onto the intake surface area 2 can be achieved.

Figure 17:
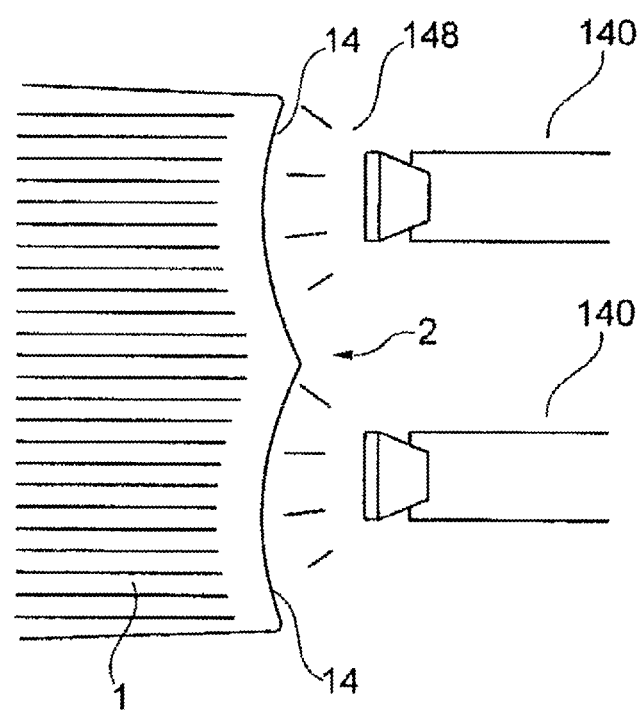
FIG. 17 shows a section view along the axial expansion direction of a compact filter element or fluted filter element with cyclones providing incoming flow.

FIG. 17 shows a further exemplary embodiment of the invention in which the intake surface 2 of the filter element 1 is provided with recesses 14 so that an optimized intake flow of the air that is dispensed by the individual cyclones 140 is achieved across the outflow path 148. Such a recess can be, for example, produced in the manufacturing process of the coil filter in that in the initial coiling areas near the coil core the fluted filter material to be coiled is laid wide while in the width of the material to be coiled initially is reduced and subsequently widens again so that across the applied coil thickness a recess 14 is produced. This can be achieved in connection with circular as well as oval coil filters. It is understood that an asymmetric lateral displacement for coiling a fluted filter material of continuous width can also produce such a recess so that at the opposed outflow side that is not shown in FIG. 17 a matching analog curved projection is formed.

It should be noted that the term "comprising" does not exclude additional elements; likewise, the term "an" and "one" does not exclude several elements and steps.

The employed reference numerals serve only for improving the understanding of the disclosure and are not be viewed as limiting wherein the protection sought for this invention is represented by the claims.

The invention claimed is:

1. Air filter for an internal combustion engine comprising air filter housing (100),
a preseparator (120),
a filter element having a first flow face on one axial end of the filter element and a second flow face on an opposing axial end of the filter element, the filter element in the form of a multiple bellows filter comprising at least an outwardly positioned filter bellows and a filter bellows that is radially inwardly positioned thereto, the outwardly positioned filter bellows and the inwardly positioned filter bellows each extending from the inlet flow face to the outlet flow face;
wherein one of the flow faces of the filter element is an inflow face;
an annular ring-shaped flow opening extending through the second flow face into the interior of the filter element, the annular flow opening extending into an annular ring-shaped flow passage formed by an radially inner surface of the outwardly positioned filter bellows and a radially outer surface of the radially inwardly positioned filter bellows;
a second flow opening extending through the first flow face and opening into a second flow passage formed by the radially inner circumferential surface of the inwardly positioned filter bellows;
a third flow opening formed at the first flow face and opening into a third flow passage formed an adjacent wall of the filter housing and an outer circumference on the radial exterior of the outwardly positioned filter element;
wherein the air filter housing (100) has a receptacle (101) for the filter element and comprises an unfiltered gas chamber area,
wherein the unfiltered gas chamber area (102) is delimited relative to the air filter by the air filter housing (100) and relative to the filter element to be inserted by a wall surface or inflow face at the unfiltered gas side,
wherein the preseparator (120) has an air outflow configuration (121), wherein the air outflow configuration corresponds with an inflow face of the filter element to be inserted,
wherein the preseparator (120) comprises a cyclone arrangement (130) with a plurality of individual cyclones (140) each having an outflow path (148), wherein the outflow paths (148) are distributed relative to and oriented toward the inflow face of the filter element,
wherein individual cyclones of the cyclone arrangement are positioned on the housing and aligned in a direction to direct their outflow paths directly towards and into a respective flow opening in the inflow face;
wherein the receptacle (101) of the air filter housing (100) is designed to receive the filter element in the form of a multiple bellows filer.

2. Air filter according to claim 1,
wherein the first flow face is the inflow face of the filter element;
wherein a first portion of the cyclones of the cyclone arrangement are positioned and aligned so as to direct their outflow paths directly towards and into the second flow opening of the first flow face;
wherein a second portion of cyclones of the cyclone arrangement are positioned and aligned so as to direct their outflow paths directly towards and into the third flow opening of the first flow face the second portion directing their outflow paths tangentially along an outer circumference of the filter element.

3. Air filter according to claim 1, wherein the plurality of individual cyclones (140) with their outflow paths (148) are distributed relative to and oriented toward an annular gap between the at least two filter bellows of the multiple filter bellows to be inserted.

4. Air filter according to claim 1, wherein the fold depth of the outwardly positioned filter bellows (10) is smaller than the fold depth of the radially inwardly positioned filter bellows (20) neighboring it.

5. Air filter according to claim 4, wherein the outwardly positioned filter bellows (10) has a shape-preserving shell (60) arranged on a side that is facing the intake side, wherein the shell (60) extends only partially across the fold depth of the outwardly positioned filter bellows (10) in a radial direction.

6. Air filter according to claim 4, wherein an individual cyclone (140) has a cyclone passage (143) having at its intake end (141) a baffle arrangement (142) that is designed to cause the incoming air to carry out a rotational movement about an axis of extension of the cyclone passage (143) and having at its outlet end (144) a concentric outlet arrangement with an inwardly positioned filtered air outlet (146) and outwardly positioned filtered particle outlet (145).

7. The air filter according to claim 1, wherein
the plurality of individual cyclones with their outflow paths (148) are distributed relative to and oriented toward an annular gap between the at least two filter bellows;
wherein the outwardly positioned filter bellows (10) has a shape-preserving shell (60) arranged on a side that is facing the intake side, wherein the shell (60) extends only partially across the fold depth of the outwardly positioned filter bellows (10) in a radial direction; and
wherein the fold depth of the outwardly positioned filter bellows (10) is smaller than the fold depth of the radially inwardly positioned filter bellows (20) neighboring it.

8. The air filter according to claim 1,
wherein the second flow face is the inflow face of the filter element;
wherein cyclones of the cyclone arrangement are individually positioned and aligned such as to direct their outflow paths directly towards and into the annular ring-shaped flow opening extending through the second flow face into the interior of the filter element.

9. The air filter according to claim 1,
wherein cyclones in the cyclone arrangement are positioned and aligned with their outlets or outlet flow geometries directed towards a respective flow opening of the inflow face;
wherein to realize the position and alignment, some cyclones are positioned on the housing at a slant relative to other cyclones.

* * * * *